July 14, 1931. W. VERNET 1,814,197
METHOD AND MEANS FOR CUTTING SPONGE RUBBER
Filed Dec. 21, 1928 4 Sheets-Sheet 4
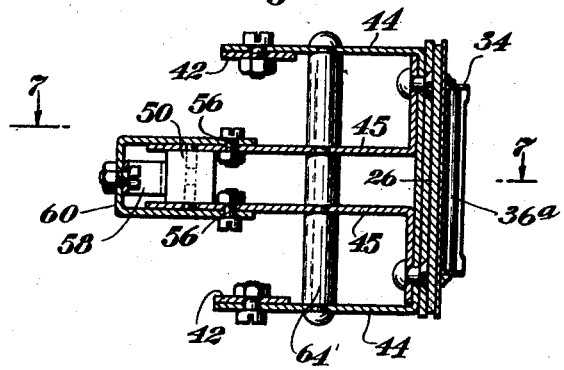
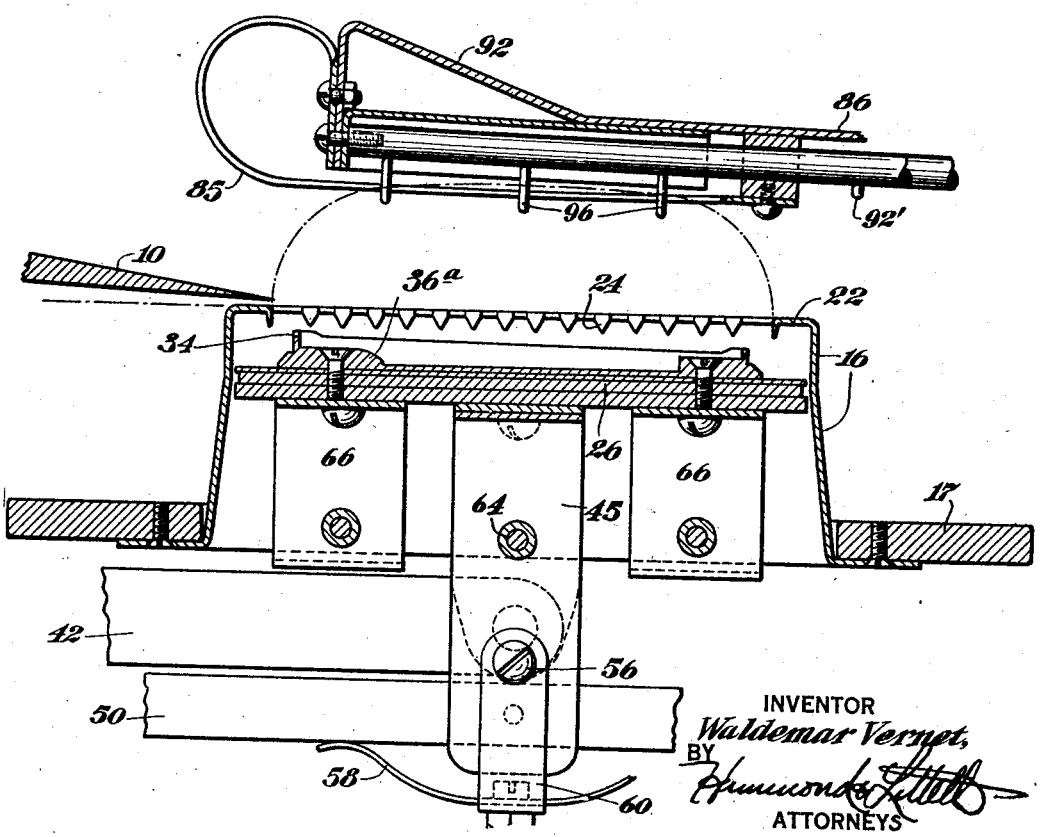

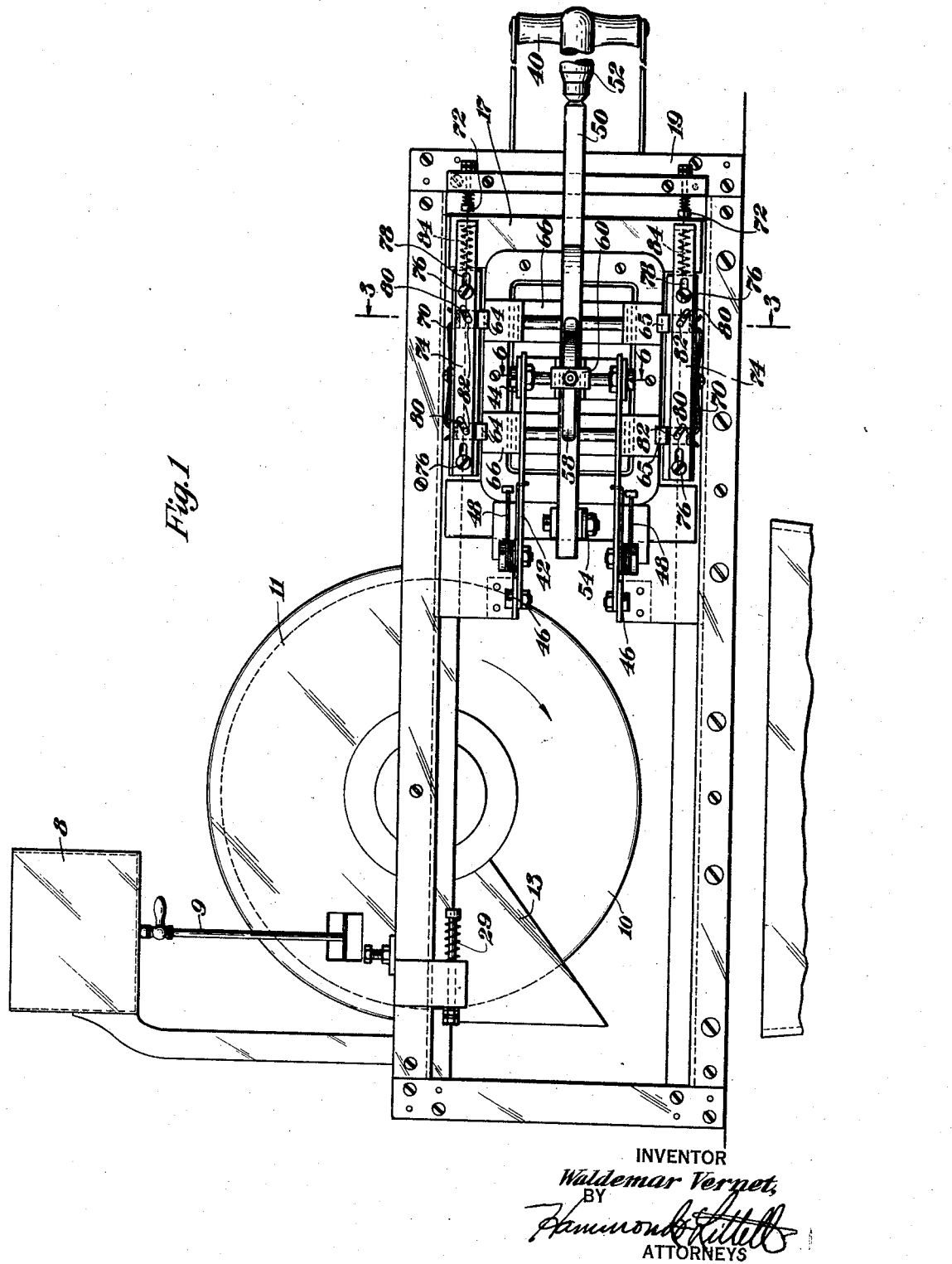

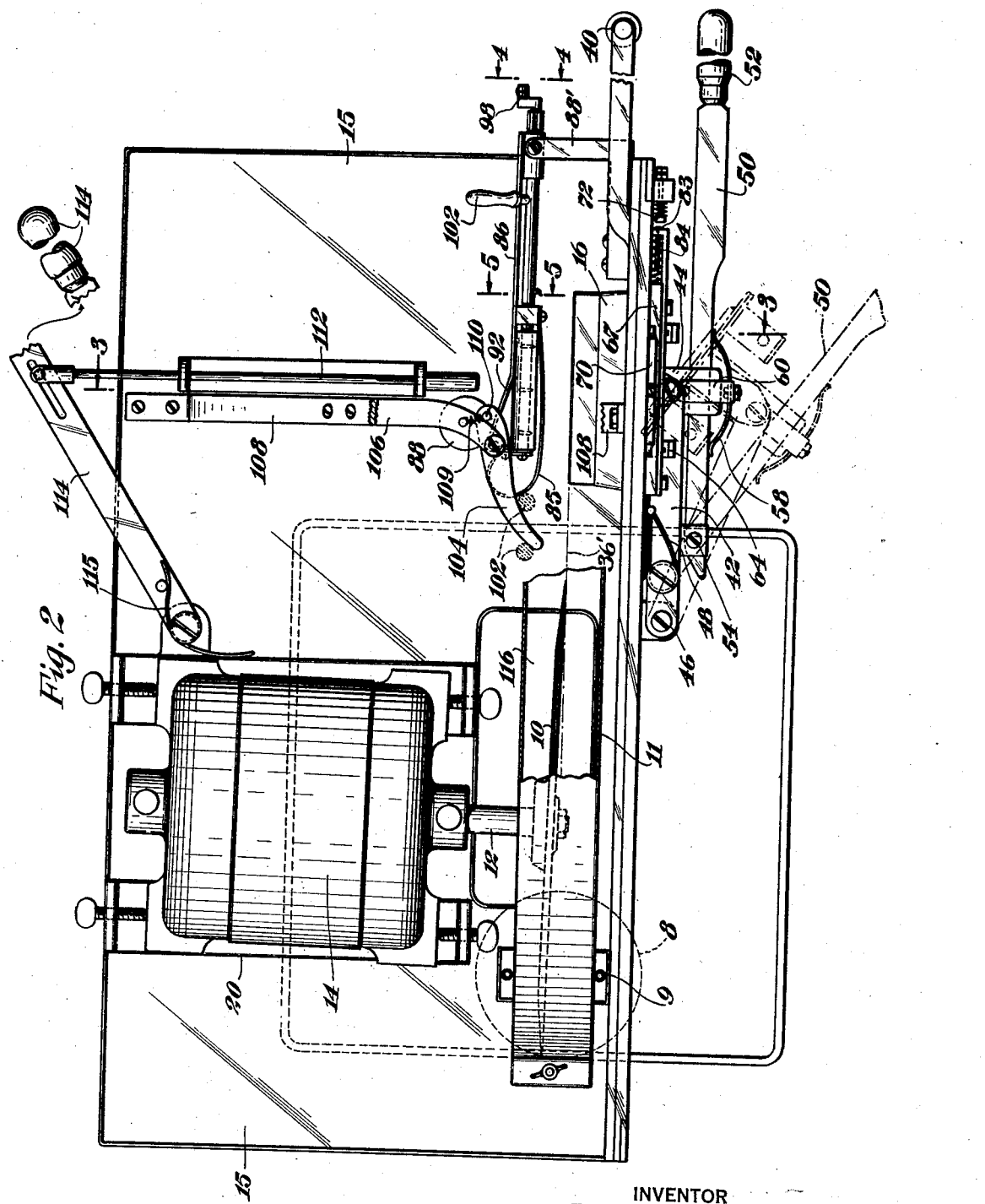

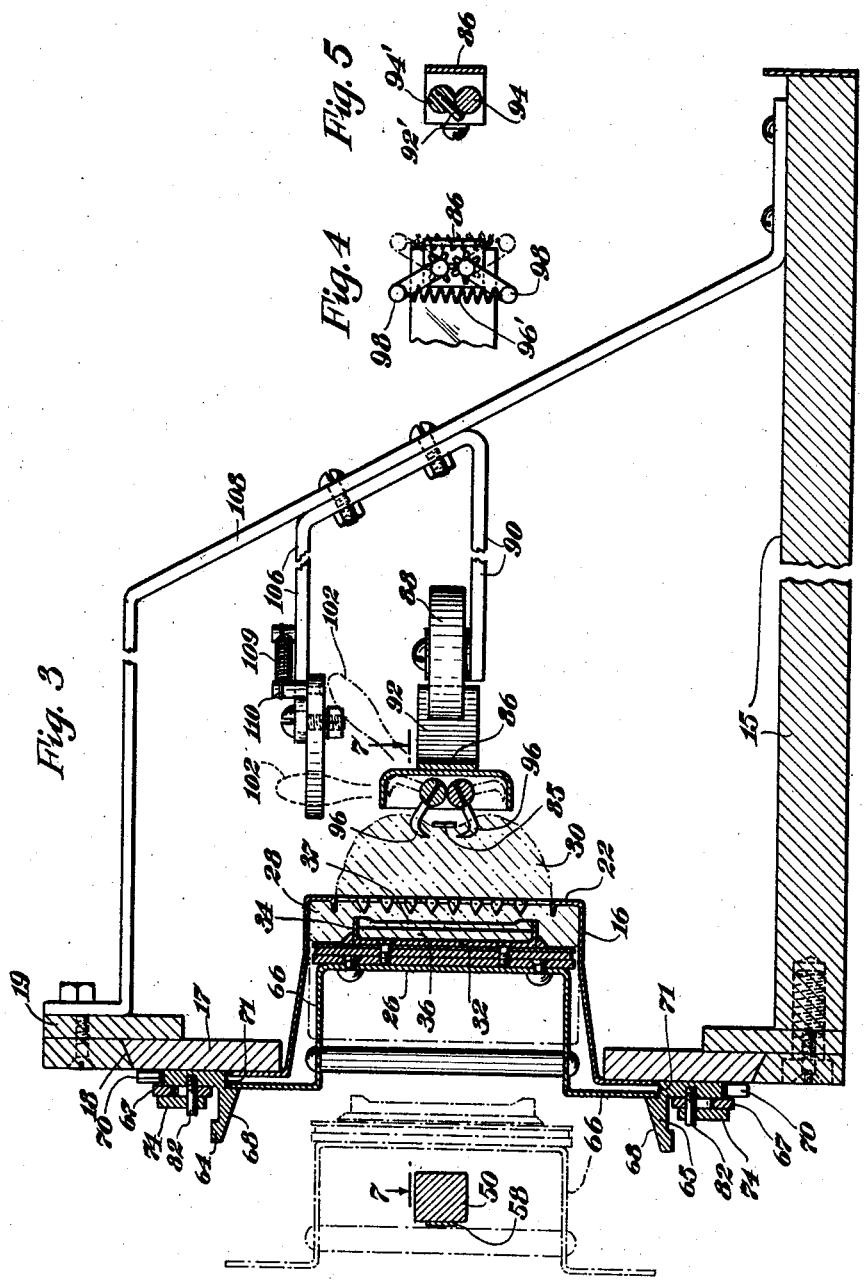

Patented July 14, 1931

1,814,197

UNITED STATES PATENT OFFICE

WALDEMAR VERNET. OF NEW YORK. N. Y., ASSIGNOR TO RUBBERSAN PRODUCTS INC.. OF NEW YORK, N. Y., A CORPORATION OF NEW YORK

METHOD AND MEANS FOR CUTTING SPONGE RUBBER

Application filed December 21, 1928. Serial No. 327,648.

The present invention relates to the manufacture of dish shaped articles from sponge rubber.

In my former application Serial No. 250,827, filed January 31, 1928, for forming receptacles of sponge rubber, I have described the manufacture of receptacles of sponge rubber. My present invention is an improvement over my said invention and aims to provide a method and apparatus for making receptacles of sponge material which shall efficiently reduce the cost of producing such articles while making articles of high quality.

It is a feature of the present invention to provide a method of cutting a symmetrical recess in a block of tough material such as sponge rubber. In producing such a result, it has been found desirable to compress the block of material to be cut around its edge while sustaining the block over one entire face so that the central portion of the block to be cut projects from the compressed part on one side. The projecting portion is then cut off while the side of the projecting portion first to meet the cutter is pressed outward more strongly than the remainder of the projecting portion.

It is an object of the present invention to provide a machine capable of cutting recesses in blocks of sponge rubber at a high rate of speed.

Further objects and advantages of the present invention will be apparent from the following description.

In order that the invention may be clearly understood, I will describe in detail a machine embodying the apparatus features of the invention and one adapted to carry out the process features of the invention. Such a machine is illustrated in the accompanying drawings in which—

Fig. 1 is an elevation of an apparatus in accordance with the present invention.

Fig. 2 is a plan of the machine shown in Fig. 1.

Fig. 3 is a section on the line 3—3 of Fig. 1 and 3—3 of Fig. 2.

Fig. 4 is a fragmentary view in elevation of a portion of the machine shown in Fig. 1 as indicated by the line 4—4 of Fig. 2.

Fig. 5 is a fragmentary section taken on the line 5—5 of Fig. 2.

Fig. 6 is a fragmentary vertical section taken on the line 6—6 of Fig. 1.

Fig. 7 is a fragmentary section taken on the line 7—7 of Fig. 3 and 7—7 of Fig. 6.

In order to cut recesses in porous material in accordance with the present invention, the block to be cut is moved relative to a cutter. It has been found more convenient to move the block and to hold the cutter stationary than to obtain the required relative movement in the reverse way, but it is merely a matter of convenience which method is employed. As shown, a revolving cutter or knife 10 is mounted on an arbor 12 driven by a motor 14 carried on a table 15. The cutter 10 may have a hood 11 over its upper half. For holding a block of sponge rubber to be recessed, a chamber or hollow frame 16 is provided and mounted on a movable frame to reciprocate in tracks 18 on a fixed frame 19 held on the table 15. Cutter 10 and tracks 18 are both set in vertical planes as is clear from Figs. 1 and 3, but the plane of cutter 10 is set at a slight angle to that of tracks 18 for a purpose that will presently appear. As shown, the angle of the cutter 10 to the line or plane of fixed frame 19 may be adjusted as desired. For this purpose, the motor 14 is held by four setscrews in lugs at the corners of a plate 20 on top of table 15. By adjusting the setscrews, the motor and cutter may be shifted with respect to the table and to frame 19. Also means including a liquid reservoir 8, pipe 9 and spreader are provided for lubricating cutter 10 with water. A shield 13 is arranged to be held against the cutter by spring 29 to remove any excess of water and prevent the sponge cuttings entering the hood 11.

The block to be cut is held in the chamber 16 and the tracks 18 are so placed with relation to the cutter 10 that a portion of a block projecting from the vertical face of the chamber on the side toward the cutter will be severed close to the face of the chamber. For holding a block of sponge rubber or other material in the desired position, chamber 16 includes an apertured wall or frame 22 having prongs 24 around the apertures projecting inwardly into the chamber 16 to hold the edges of the block against slipping through the aperture in the wall. The face of the block opposite the apertured wall 22 of the chamber is supported and pressed against by a door 26 which strongly compresses the periphery of the block between itself and the front wall or face 22 which surrounds the aperture. In Fig. 3, the compressed portion of a block held in chamber 16 is indicated at 28 and the portion of the block to be cut off and projecting out of the chamber 16 is indicated at 30. It will be seen that the projecting portion of the block is entirely surrounded by the compressed portion or area. In order to form a sharp outline to the depression in the sponge, the inner face of door 26 has fixed thereto a cup or flanged plate 32, the edges or flanges 34 of which project toward the aperture in wall 22. The cup 32 has a less projected area than the aperture in wall or frame 22 and has, as shown, an outline substantially like that of the aperture in the wall. Preferably also the cup is higher at the corners to give it a firmer grip on the block at these points and help to hold the compressed portion of the block outward toward the wings of chamber 16 so that it cannot slip through the aperture and also to press outwardly on the edges of the projecting portion 30. The chamber 16 is so mounted that it may move relative to cutter 10 so that the face of wall 22 of the chamber moves close to the cutting edge. The line of movement of wall 22 is indicated on Fig. 2 by the line 36' which shows that the cutter barely clears the face of the wall. The plane of cutter 10 makes an angle with the line 36' as it has been found that this relative arrangement promotes speed of operation and helps to produce a smooth cut. Also the chamber 16 is so mounted that it carries the block against the lower half of cutter 10 so that the severed part may drop free. The apparatus illustrated in the drawings is one adapted to produce a flat or plane bottomed recess in a block of tough porous resilient material such as sponge rubber. The resulting article is, therefore, symmetrical with respect to a central plane at right angles to the line of cut, assuming that the block cut is symmetrical in plan. In order to insure a recess of symmetrical form, it has been found necessary to support or press against the block more strongly on the side initially toward the cutter. For this purpose, the bottom of the cup 32 within chamber 16 is built up as indicated at 36$^a$ in Fig. 7. Also the flange of plate 32 is higher on the side toward the cutter, thereby pressing more strongly against the block on the high of the flanges.

By means of the arrangement shown and just described, the cutter takes out the necessary material to form a recess of uniform depth in the block, having substantially smooth side walls and sharp corners, a plane bottomed recess of uniform depth being desired for soap dishes and like articles. The chamber 16 in which the block is held for cutting is illustrated as formed of sheet metal pressed or stamped to the desired shape. The edges of the chamber are fixed to the movable frame 17. The chamber 16 is reciprocated by the operator when desired by a handle 40 fixed to the frame 17. The door 26 of chamber 16 is shown as mounted on pivoted arms 42, 42 by standards 44, 44, so as to project into the chamber and to exert the desired pressure on the block of material to be cut. The arms 42 are pivoted to the movable frame 17 at 46, 46. Arms 42 carry springs 48, 48 one end of each of which bears against the movable frame 17 and the other end of which bears against the arm 42 so as to urge the arm outward away from the frame, thus tending to open the door 26. Door 26 is closed by a lever 50 having an operator's handle 52 thereon. Lever 50 is pivoted to the movable frame 17 at a point 54 which is spaced laterally from the arms 42 so as to offset handle 52 from handle 40. Lever 50 is shown as arranged between two plate standards 45, 45 and is connected by pins to the standards 45 when moved to force door 26 to its closed position. See Fig. 6. A strap 60 fixed to the standards 45 serves to prevent lever 50 from becoming disconnected from the door 26. Preferably a leaf spring 58 is interposed between the lever 50 and the strap 60 to facilitate a sliding movement between the two. The lever 50 is pivoted nearer the center of the door 26 than arms 42 so as to give greater leverage in closing the door. The standards 44 and 45 are shown connected together by a brace 64.

After door 26 has been forced shut by the lever 50, it is held in closed position as long as desired by latches 64, 64 above the door and latches 65, 65 below the door. Latches 64 and 65 are held against the side of frame 17 by stationary members 67 (Fig. 3) and are mounted for vertical movement. The door carries two straps 66, 66, the centers of which are of U form, but the outer ends of which are bent outward parallel to the movable frame 17 and contact with inclined cam faces 68, 68 on the latches to spread the latches 64 from latches 65 to permit the door to close. When the door is in closed position, latches 64 and 65 are moved by springs 70 (Fig. 1) to engage the ends of straps 66 and to hold the strap ends in rabbeted portions 71 of the latches as clearly shown in Fig. 3 in which the latches are shown in their locking position. After the movable frame 17 carrying the chamber 16 has been moved to carry a block against the cutter, it is drawn back by the operator and the latches automatically released to permit the springs 48 to open the door 26. The releasing or unlatching means are shown as including stops 72, 72 carried on the fixed frame 19 and contacting with the ends of cam bars 74, 74 mounted by screws 76 for limited movement, on the movable frame 17 in the direction parallel to the tracks 18, screws 76, 76 passing through lengthwise slots 78, 78 in the cam bars. Cam bars 74 have inclined cam slots 80, 80 therein into which pins 82, 82 on the latches 64 extend so that the latches are spread apart to release the door 26 whenever the ends of the cam bars strike the stops 72. See Fig. 1. Cam bars 74 are held normally inactive with respect to latches 64 by means of springs 84 pressing against the ends of fixed bars 67 and the inturned ends 83 of cam bars 74 (Fig. 2).

At the time the block to be cut is placed in chamber 16 and door 26 closed to partially project the block from the chamber, it is desired to support the projecting portion of the block. For this purpose, I have shown a looped spring 85 carried on a bar 86 fixed to the movable frame 17 by a standard 88'. Spring 85 is held in such position that it contacts with the projecting portion of the block as shown in Figs. 2, 3 and 7. It is preferred to hold the bar 86 from movement at the moment the block is first forced against the spring and until the block is additionally supported. For this purpose, a roller 88 is provided which is carried on a bracket 90 and which bears against an outwardly inclined portion 92 at the free end of bar 86 on the side removed from the block at the time the block enters chamber 16. In order to support the projecting portion of the block during the cutting operation a gripping mechanism is provided mounted also on the bar 86. Such mechanism includes, as shown, two rods 94' and 94 journalled to oscillate in the bar 86 about their longitudinal axes and carrying opposed sets of curved prongs 96, 96 adapted to bite into the block on opposite sides of spring 85 and to grasp between them the portion of the block in contact with the spring. Rods 94' and 94 are geared together as shown in Fig. 4 and a spring 96' between pins 98, 98 on levers at the ends of the rods tends to hold the rods in either their open or closed position of the prongs 96. A stop pin 92' (Fig. 5) is provided on rod 94' to limit the movement of the rods under the influence of spring 96' by stricking rod 94. A handle 102 is provided whereby the rods may be turned to close the prongs to enable them to grasp a block. Handle 102 also forms part of means to open the prongs automatically after the projecting portion of the block has been severed to permit it to drop from the prongs 96. The automatic means for operating handle 102 includes a cam lever 104 pivoted in a horizontal plane on bracket 106 fixed to a brace 108 extending between fixed frame 19 and table 15. A spring 109 holds lever 104 in the path of handle 102 as the movable frame is advanced toward the cutter 10, thereby helping to hold the handle upright so that the prongs grasp the block firmly. During the cutting operation, however, the handle advances beyond the end of lever 104 and the spring then swings the lever 104 so that the curved end of the lever is in the return path of the handle. A stop pin 110 on the lever prevents the lever from turning out of the path of the handle 102 on its return movement and forces the handle to swing clockwise as viewed in Fig. 3 to open the prongs and release the severed portion of the block, and when the pins 98 pass the vertical position, the spring 96 holds the prongs open until a new block is inserted in the chamber 16 and the handle 102 turned to project the prongs 96 into the protruding portions of the block.

A rod 112 is mounted to reciprocate transversely to the tracks 18 in line with the aperture of plate 22 and the door 26 at the time the chamber 16 stands at the end of its movement away from the cutter, to push the recessed block out of the chamber. Rod 112 is used after door 26 has opened and it is moved to push out the block by a handled lever 114 and is returned to its inactive position by a spring 115.

It will be understood that, in the operation of the apparatus above described, the operator first places a block to be cut in chamber 16 and closes the door 26 to cause the central portion of the block to project from the chamber. The grasping prongs 96 are then closed on the outer portion of the block. The movable carriage is then pushed forward to bring the block against the cutter to sever the projecting portion and the carriage withdrawn. The prongs 96 are opened automatically by the means above described during the first part of the return movement of the carriage or movable frame to release the severed outer portion of the block which drops through an opening 116 in the table. The door 26 is opened automatically at the end of the return movement of the movable frame to release the finished article which is pushed out of chamber 16, if necessary, by rod 112. The apparatus is then in position to repeat the operations just mentioned in connection with another block.

It will be seen that I am able, not only to make uniform and high quality articles from sponge rubber or other tough resilient material, but that I can produce such articles at a very high rate of speed and that with inexpensive apparatus.

While the machine illustrated embodies the best form of my invention now known to me, it will be understood that modifications and changes may be made therein and the construction varied without departing from the principle and spirit of my invention or the scope of the appended claims.

I claim:

1. The method of cutting a symmetrical recess in tough porous resilient material comprising compressing the edges of a block of such material to cause a portion of the block within the compressed portion to project, cutting the projecting portion of the block while applying pressure to the face of the block opposite the projecting portion and supporting the projecting portion during the cutting operation.

2. The method of cutting a symmetrical recess in tough porous resilient material comprising compressing a block of such material around a restricted closed area to cause a portion of the block enclosed by said area to project, supporting the outer part of said projecting portion, and cutting the projecting portion from the block while supporting the block on the face opposite said projecting portion and pressing on the face of the block in greater degree on the side which is toward the cutter before the severance occurs.

3. The method of cutting a flat bottomed recess in a block of sponge rubber comprising compressing a block of such material around a restricted closed area to cause a portion of the block to project, causing relative motion between the block and a cutter along a line at an angle to the plane of the cutter, and cutting the projecting portion of the block while applying pressure thereon on the face opposite the projecting portion and in greater degree on the side initially toward the cutter.

4. An apparatus adapted to cut recesses in the faces of blocks of sponge rubber by removing a central portion of said block, said apparatus having a cutter and a chamber for holding the block to be cut, said chamber including an apertured frame, means engaging the block around the opening of the frame to hold the block within the chamber, a door in the side of the chamber opposite said frame, and means to remove said block through said door.

5. Apparatus adapted to cut recesses from blocks of sponge rubber and having an apertured frame, a hinged plate arranged to press a block to be cut against said frame, and a cup on said plate opposite the aperture and cutting means to cut the rubber.

6. Apparatus adapted to cut recesses in blocks of sponge rubber and having a cutting means, an apertured frame, a plate arranged to press a block to be cut against said frame and a cup on said plate opposite the aperture in the frame and having its edge higher on one side than on the other said cutting means adapted to remove a portion of said block.

7. Apparatus adapted to cut recesses in blocks of sponge rubber having a cutter, an apertured frame, a plate arranged to press a block to be cut against said frame and having a raised portion on the side of the block on which the cut begins said cutting means adapted to sever a portion from said block.

8. Apparatus adapted to cut recesses in blocks of sponge rubber having an apertured chamber provided with a door arranged to press a block to be cut against the apertured wall of the chamber, the door having a projection on its inner face on the side of the block on which the cut begins and a cutting means adapted to be brought into contact with a part of said sponge rubber block.

9. Apparatus adapted to cut recesses in blocks of sponge rubber and having a cutter, an apertured frame, a plate arranged to press a block to be cut against the inner face of said frame, a cup on said plate opposite the aperture in the frame, and supporting means carried from said frame and arranged to act on the portion of a block projecting through the aperture.

10. Apparatus as set forth in claim 9 and in which the supporting means comprise grasping prongs.

11. Apparatus adapted to cut recesses in blocks of sponge rubber and having a cutter and an apertured frame arranged for relative movement to bring a portion of a block projecting from said frame into cutting relation with the cutter, supporting means holding the projecting portion during the cutting operation and means automatically withdrawing the supporting means from said portion after it has been severed from the block.

12. Apparatus adapted to cut recesses in blocks of sponge rubber comprising a cutter and an apertured chamber mounted for relative motion to bring a portion of a block projecting from the chamber into operative relation to the cutter, a door for the chamber pressing against the block during the cutting, and means automatically opening the door after the projecting portion has been cut off the block.

13. Apparatus adapted to cut recesses in blocks of sponge rubber and having a cutter, an apertured chamber mounted for relative movement to bring a portion of a block projecting from the chamber into operative relation to the cutter, a door for the chamber pressing against the block during the cutting operation, supporting means piercing the projecting portion during the cutting, means automatically withdrawing the piercing means from said portion after it has been cut off, and means automatically opening said door after the cutting operation.

14. Apparatus adapted to cut recesses in blocks of sponge rubber and having a cutter and an apertured frame arranged for relative movement to bring a portion of a block projecting from said frame into cutting relation with the cutter, and a spring supported from said frame so as to press against the projecting portion of a block.

15. Apparatus adapted to cut recesses from blocks of sponge rubber and having a cutter and an apertured frame arranged for relative movement to bring a portion of a block projecting from said frame into operative relation to said cutter, and grasping prongs supported from said frame and adapted to pierce and support a portion of a block projecting from the frame.

16. Apparatus adapted to cut recesses in blocks of sponge rubber including a motor driven cutter blade, and having a spring pressing against a portion to be cut from a block, and grasping prongs piercing the portion to be cut on opposite sides of said spring.

17. Apparatus adapted to cut recesses in blocks of sponge rubber and having an apertured frame a rapidly driven cutter blade, a plate arranged to press a block to be cut against said frame, and a cup on said plate opposite the aperture in the frame.

18. Apparatus for cutting recesses in blocks of sponge rubber having an apertured chamber arranged to hold a block to be cut and having a door positioned to press a block against the aperture, a cutter blade, means to operate said blade to cut a portion of said block, and an ejecting rod mounted to move in line with the aperture and door to engage with and remove the cut off portion.

19. An apparatus adapted to cut recesses in blocks of sponge rubber and having a cutter and a chamber for holding a block to be cut, the chamber mounted to approach and withdraw from the cutter, said chamber including an apertured wall through which said blocks are introduced and a door to hold said block in position opposite said wall, a latch for said door, and a release arranged to act on said latch during the withdrawing movement of the chamber.

20. Apparatus adapted to cut recesses in blocks of sponge rubber and having a cutter, a chamber for holding a block to be cut and having an apertured wall, means whereby a block may be positioned in said chamber to project partially through said wall, and grasping prongs mounted to oscillate and adapted to hold the portion of a block projecting from said chamber said cutter being adapted to be brought into contact with said block to sever said projecting portion therefrom.

21. An apparatus adapted to cut recesses in blocks of sponge rubber including a cutter blade and having an apertured chamber with a door opposite the aperture said cutter blade adapted to sever a portion from the block and a spring retracted pusher positioned to eject a cut block from the chamber.

22. An apparatus adapted to cut recesses in sponge rubber and having an apertured frame, a rapidly driven cutter blade, a plate arranged to press a block to be cut against said frame, the frame having prongs projecting toward said plate and the plate having a cup whose edge projects toward the aperture in the frame and which has a less projected area than the aperture and a means to bring said blade into contact with said block.

23. An apparatus adapted to cut recesses in blocks of sponge rubber comprising an apertured frame, means pressing a block to be cut against said frame to cause a portion of the block to project, piercing means supported from said frame and including an operating lever moving the piercing means into and out of the projecting portion, a cutter, means whereby an approaching and separating movement may be set up between the cutter and frame, and a cam in inoperative relation to the lever during the approaching movement and acting to withdraw the piercing means from the projecting portion during the separating movement of the cutter and frame.

24. A machine for cutting the centers from a block of porous sponge rubber to form a depression therein, said machine comprising a hollow frame, the center of which has the shape of the depression desired, means to cause said frame to compress the block and permit the center to project therethrough, means to secure the frame and block in compressing relation, means to sever the projecting portion of the sponge rubber, and means to remove the pressure on said sponge rubber block.

25. A machine for forming depressions in artificial sponge material, said machine comprising a hollow frame having a portion conforming to the size and shape of the depression desired, means to cause said frame to compress said sponge material and a portion of said sponge to be projected through said frame, means tending to additionally force certain portions of said sponge through said frame, means to prevent movement of certain portions of said sponge during compression, means to secure said frame and sponge in compressing relation, means to remove said projecting portion of said sponge material, and means to relieve the pressure on said sponge material to permit it to form a receptacle after removal of the projecting portion.

26. A machine for forming depressions in artificial rubber sponge, said machine comprising a hollow frame, a portion of which conforms to the size and shape of the depression desired, means to cause said frame to compress said sponge, and permit a portion of said sponge to be projected through the frame, means tending to additionally force certain portions of said sponge through said frame, means to prevent movement of certain portions of said sponge during compression, means to engage said projecting portion to aid in its removal, means to hold said frame and said sponge in compressing relation, means to remove said projecting portion of said sponge, and means to relieve the pressure on said sponge to permit it to form a receptacle after removal of said projecting portion.

In testimony whereof I have affixed my signature to this specification.

WALDEMAR VERNET.